United States Patent
Sung et al.

(10) Patent No.: US 11,369,961 B2
(45) Date of Patent: Jun. 28, 2022

(54) APPARATUS AND METHOD FOR WASHING AND CONCENTRATING MICROPARTICLES ENCAPSULATED IN MICROSCALE DROPLETS USING ACOUSTIC RADIATION FORCE

(71) Applicant: KOREA ADVANCED INSTITUTE OF SCIENCE AND TECHNOLOGY, Daejeon (KR)

(72) Inventors: Hyung-Jin Sung, Daejeon (KR); Jinsoo Park, Daejeon (KR); Ghulam Destgeer, Daejeon (KR); Yeunwoo Cho, Daejeon (KR); Hyoungsoo Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 197 days.

(21) Appl. No.: 16/705,847

(22) Filed: Dec. 6, 2019

(65) Prior Publication Data

US 2020/0206738 A1 Jul. 2, 2020

(30) Foreign Application Priority Data

Dec. 26, 2018 (KR) .................. 10-2018-0168922

(51) Int. Cl.
  *B01L 3/00* (2006.01)
  *G01N 15/10* (2006.01)
  *G01N 15/00* (2006.01)

(52) U.S. Cl.
  CPC ..... *B01L 3/502753* (2013.01); *B01L 3/50273* (2013.01); *B01L 3/502761* (2013.01);
  (Continued)

(58) Field of Classification Search
  CPC ............. B01L 3/502753; B01L 3/5027; B01L 3/50273
  See application file for complete search history.

(56) References Cited

U.S. PATENT DOCUMENTS

2013/0330247 A1* 12/2013 Wilson .................. G01N 1/286
                                                  422/504

FOREIGN PATENT DOCUMENTS

KR      101810066 B1     12/2017
KR      101855490 B1      5/2018

OTHER PUBLICATIONS

Brouzes et al., "Rapid and continuous magnetic separation in droplet microfluidic devices," Lab Chip (2015), 15(3): 908-919.
(Continued)

*Primary Examiner* — Brian J. Sines
(74) *Attorney, Agent, or Firm* — Medler Ferro Woodhouse Mills PLLC

(57) ABSTRACT

The present invention provides an apparatus and method for washing and concentrating microparticles encapsulated in microscale droplets using an acoustic radiation force. The apparatus includes: a piezoelectric substrate; a slanted finger interdigital transducer (SIDT) electrode deposited on the piezoelectric substrate and configured to generate surface acoustic waves under an AC signal applied thereto; and a microfluidic chip which is adhered to the piezoelectric substrate with being spaced apart from the SIDT electrode, has a microscale channel section formed therein, in which a single continuous phase and a plurality of dispersed phases are injected, respectively, and includes a plurality of inlet ports into which continuous and dispersed phases are injected, and a discharge port from which a plurality of droplets composed of the continuous and dispersed phases and generated by the intersection thereof are discharged.

18 Claims, 5 Drawing Sheets

(52) U.S. Cl.
CPC ...... *G01N 15/1056* (2013.01); *B01L 2200/10* (2013.01); *B01L 2300/0645* (2013.01); *B01L 2300/12* (2013.01); *B01L 2400/0436* (2013.01); *B01L 2400/0439* (2013.01); *G01N 2015/0019* (2013.01)

(56) References Cited

OTHER PUBLICATIONS

Destgeer et al., "Microchannel Anechoic Corner for Size-Selective Separation and Medium Exchange via Traveling Surface Acoustic Waves," Anal. Chem. (2015), 87: 4627-4632.
Doonan et al., "K-Channel: A Multifunctional Architecture for Dynamically Reconfigurable Sample Processing in Droplet Microfluids," Anal. Chem. (2017), 89: 4091-4099.
Fornell et al., "Controlled Lateral Positioning of Microparticles Inside Droplets Using Acoustophoresis," Anal. Chem. (2015), 87: 10521-10526.
Fornell et al., "An intra-droplet particle switch for droplet microfluidics using bulk acoustic waves," Biomicrofluidics (2017), 11: 031101.
Han et al., "In-droplet cell concentration using dielectrophoresis," Biosensors and Bioelectronics (2017), 97: 41-45.
Iwai et al., "A Bead-In-Droplet Solution Exchange System Via Continuous Flow Microfluidic Railing," Proceedings of the 2013 IEEE 26th International Conference on MEMS (Jan. 20-24, 2013, Taipei, Taiwan).
Jung et al., "On-demand droplet splitting using surface acoustic waves," Lab Chip (2016), 16: 3235-3243.
Lee et al., "Droplet-based microfluidic washing module for magnetic particle-based assays," Biomicrofluidics (2014) 8: 044113.
Park et al., "In-droplet microparticle separation using travelling surface acoustic wave," Biomicrofluidics (2017): 11: 064112.
Park et al., "Acoustic in-droplet sample washing and enrichment," Conference Abstract in Acoustofluidics (2018), a CBMS Workshop (Aug. 29-31, 2018, Lille, France).
Park et al., "Acoustic in-droplet sample washing and enrichment," Presentation at Acoustofluidics (2018), a CBMS Workshop (Aug. 29-31, 2018, Lille, France).
Park et al., "In-droplet microparticle washing and enrichment using acoustic radiation force," Proceedings of the 2018 Fall Conference of the Korean Society of Visualization (Nov. 29-30, 2018, Busan, South Korea).
Park et al., "Medium exchange and enrichment of microparticles encapsulated in microscale droplets," Presentation at DFD 2018 Atlanta (Nov. 19, 2018, Atlanta, Georgia, USA).
Park et al., "In-droplet microparticle washing and enrichment using surface acoustic wave-driven acoustic radiation force," Lap Chip (2018), 18: 2936-2945.
Wang et al., "Bead mediated separation of microparticles in droplets," PLoS ONE (2017), 12(3): e0173479.

\* cited by examiner

APPARATUS AND METHOD FOR WASHING AND CONCENTRATING MICROPARTICLES ENCAPSULATED IN MICROSCALE DROPLETS USING ACOUSTIC RADIATION FORCE

CROSS-REFERENCE TO RELATED APPLICATION

Pursuant to 35 U.S.C. § 119(a), this application claims the benefit of earlier filing date and right of priority to Korean Patent Application No. 10-2018-0168922, filed on Dec. 26, 2018 in the Korean Intellectual Property Office, the entire disclosure of which is incorporated herein by reference.

BACKGROUND OF THE INVENTION

1. Field of the Invention

The present invention relates to an apparatus and method for washing and concentrating microparticles encapsulated in microscale droplets using an acoustic radiation force, and specifically to an apparatus and method for washing and concentrating microparticles encapsulated in microscale droplets using an acoustic radiation force, which are capable of selectively washing the microparticles encapsulated in microscale droplets as desired in a continuous non-contact and unlabelled manner, and increasing microparticle populations by concentrating the microparticles encapsulated in the microscale droplets.

2. Description of the Related Art

Droplet-based microfluidic technologies are applied to various fields such as biochemical analysis, new drug development, and high-speed mass screening based on droplets composed of two types of fluids which do not mix with each other.

Such technologies have an advantage of facilitating high-speed automation of processes on the basis of a small amount of samples using microscale droplets without a risk of Taylor dispersion or cross contamination, and are thereby being actively researched.

According to market analysis reports of Yole Development and Lux Research, the healthcare market using the microfluidic technology is expected to grow to 5 to 6 trillion by 2020 (Non-Patent Documents 1 and 2).

Among them, fields in which droplet-based microfluidic technology is used, such as dual liquid biopsy, new drug development, and biochemical analysis, are a big part of the healthcare market.

In particular, liquid biopsy using the microfluidic technology has attracted great attention as one of the top 10 emerging technologies selected by the 2018 World Economic Forum.

In order to make various applications on the basis of the droplet-based microfluidic technology, a basic technology for precisely controlling the droplets in a microfluidic chip is required, and examples thereof include generation, split and separation of the droplets, and manipulation of a sample in the droplets.

Meanwhile, a number of technologies for washing microparticles in microscale droplets have been proposed in the art.

Non-Patent Document 3 relates to washing microparticles in droplets in a continuous contact and unlabelled manner, Non-Patent Document 4 relates to washing microparticles in droplets in a discontinuous contact and unlabelled manner, and Non-Patent Documents 5 and 6 relate to washing microparticles in droplets in a continuous contact and labelled manner.

In particular, in the case of Non-Patent Document 4, since flows in directions opposite to each other are sequentially provided, a continuous process is impossible.

That is, in Non-Patent Document 4, since a flow of microparticles flowing from a left to a right should be applied to the apparatus, then a flow of microparticles flowing from the right to the left which is an opposite direction should be applied to the apparatus, there is a problem that the continuous process is impossible.

In addition, Non-Patent Documents 7 to 11, which are technologies of concentrating microparticles in droplets, relate to amplifying a concentration which is the microparticle populations per unit volume of droplets by focusing the microparticles in the droplets to a specific position in the droplets using an external force such as a magnetic force, dielectric force, acoustic force, or the like, then decreasing a volume of the droplets in a region in which the microparticles are not located by splitting. The microparticle populations in the droplets remain constant or reduce due to unwanted leakage from the droplets.

In particular, there are technologies for focusing the microparticles in droplets using an acoustic radiation force (Non-Patent Documents 8, 9 and 11). However, since these technologies are methods of increasing the concentration of microparticles in the droplets by reducing the volume of the droplets containing the microparticles, it cannot be seen as a concentration process to increase the microparticle populations in the droplets.

PRIOR ART DOCUMENT

Patent Document (Patent Document 1) KR 10-1810066 B1 (published on Dec. 20, 2017)
(Patent Document 2) KR 10-1855490 B1 (published on May 8, 2018)

Non-Patent Document (Non-Patent Document 1) B. Roussel, Microfluidic Applications in the Pharmaceutical, Life Sciences, In-Vitro Diagnostic, and Medical Device Markets Report (2015)
(Non-Patent Document 2) M. Todorovic and N. Kurkjy, Health Care Microfluidics Value Chain: A Story of Growing Pains (2015)
(Non-Patent Document 3) Iwai, Kosuke et al. "A Bead-in-Droplet Solution Exchange System Via Continuous Flow Microfluidic Railing." 2013 IEEE 26th International Conference on Micro Electro Mechanical Systems (MEMS), 2013, pp. 1203-1206.
(Non-Patent Document 4) Wang, S. et al. "Bead Mediated Separation of Microparticles in Droplets." PLoS One, vol. 12, no. 3, 2017, p. e0173479, doi:10.1371/journal-.pone.0173479.
(Non-Patent Document 5) Lee, H. et al. "Droplet-Based Microfluidic Washing Module for Magnetic Particle-Based Assays." Biomicrofluidics, vol. 8, no. 4, 2014, p. 044113, doi:10.1063/1.4892495.
(Non-Patent Document 6) Doonan, S. R. and R. C. Bailey. "K-Channel: A Multifunctional Architecture for Dynamically Reconfigurable Sample Processing in Droplet Microfluidics." Anal Chem, vol. 89, no. 7, 2017, pp. 4091-4099, doi:10.1021/acs.analchem.6b05041.

(Non-Patent Document 7) Brouzes, E. et al. "Rapid and Continuous Magnetic Separation in Droplet Microfluidic Devices." Lab Chip, vol. 15, no. 3, 2015, pp. 908-919, doi:10.1039/c41c01327a.

(Non-Patent Document 8) Fornell, A. et al. "Controlled Lateral Positioning of Microparticles inside Droplets Using Acoustophoresis." Anal Chem, vol. 87, no. 20, 2015, pp. 10521-10526, doi:10.1021/acs.analchem.5b02746.

(Non-Patent Document 9) Fornell, A. et al. "An Intra-Droplet Particle Switch for Droplet Microfluidics Using Bulk Acoustic Waves." Biomicrofluidics, vol. 11, no. 3, 2017, p. 031101, doi:10.1063/1.4984131.

(Non-Patent Document 10) Han, S. I. et al. "In-Droplet Cell Concentration Using Dielectrophoresis." Biosens Bioelectron, vol. 97, 2017, pp. 41-45, doi:10.1016/j.bios.2017.05.036.

(Non-Patent Document 11) Park, K et al. "In-Droplet Microparticle Separation Using Travelling Surface Acoustic Wave." Biomicrofluidics, vol. 11, no. 6, 2017, p. 064112, doi:10.1063/1.5010219.

(Non-Patent Document 12) Jung, J. H. et al. "On-Demand Droplet Splitting Using Surface Acoustic Waves." Lab Chip, vol. 16, no. 17, 2016, pp. 3235-3243, doi:10.1039/c61c00648e.

(Non-Patent Document 13) Destgeer, G. et al. "Microchannel Anechoic Corner for Size-Selective Separation and Medium Exchange Via Traveling Surface Acoustic Waves." Anal Chem, vol. 87, no. 9, 2015, pp. 4627-4632, doi: 10.1021/acs.analchem.5b00525.

SUMMARY OF THE INVENTION

In consideration of the above-mentioned circumstances, it is an object of the present invention to provide an apparatus and method for washing and concentrating microparticles encapsulated in microscale droplets using an acoustic radiation force, which are capable of selectively washing the microparticles encapsulated in microscale droplets as desired in a continuous non-contact and unlabelled manner, and increasing microparticle populations by concentrating the microparticles encapsulated in the microscale droplets.

To achieve the above object, according to an aspect of the present invention, there is provided an apparatus for washing and concentrating microparticles encapsulated in microscale droplets using an acoustic radiation force, the apparatus including: a piezoelectric substrate; a slanted finger interdigital transducer (SIDT) electrode deposited on the piezoelectric substrate and configured to generate surface acoustic waves under an AC signal applied thereto; and a microfluidic chip which is formed in a block form and is adhered to the piezoelectric substrate with being spaced apart from the SIDT electrode, has a microscale channel section formed therein, in which a single continuous phase and a plurality of dispersed phases are injected, respectively, so that a plurality of different droplets are formed by intersection thereof, and includes a plurality of inlet ports into which the single continuous phase and the plurality of dispersed phases are injected, respectively, and a discharge port from which a plurality of droplets composed of the continuous phase and the respective dispersed phases and generated by the intersection thereof are discharged, wherein the continuous phase is a fluid which is not mixed with the plurality of dispersed phases, the plurality of dispersed phases are fluids which are mixed with each other, and the plurality of dispersed phases include a dispersed phase containing solid microparticles and a dispersed phase that does not contain solid microparticles, and the AC signal is a periodic signal in which oscillation periods and rest periods are alternately repeated, and the surface acoustic wave generated from the SIDT electrode under the AC signal applied thereto is transmitted to the channel section in a direction perpendicular to a direction in which the droplets flow in the channel section.

Herein, The SIDT electrode may include: a first electrode terminal and a second electrode terminal formed at both end portions of the piezoelectric substrate; and a plurality of first finger electrodes and a plurality of second finger electrodes, which protrude from the first and second electrode terminals, respectively, toward each other in a longitudinal direction of the SIDT electrode with being alternately formed in a width direction thereof, and are deposited in a pattern shape in which the first and second finger electrodes are interposed therebetween like two forks whose ends are overlapped to face each other with being alternately disposed so as not to contact with each other.

At this time, metal electrodes forming the plurality of first finger electrodes and the plurality of second finger electrodes may have a width of $\lambda/4$, respectively, and the respective metal electrodes have a gap of $\lambda/4$ formed between, wherein $\lambda$ is a wavelength of the surface acoustic wave.

In addition, the respective widths of the plurality of first finger electrodes and the plurality of second finger electrodes and the gaps between each of the first finger electrodes and the second finger electrodes may be formed so as to be linearly varied along the longitudinal direction of the SIDT electrode so that the first and second finger electrodes form a trapezoidal slanted comb shape as a whole.

Further, the channel section may be formed in a cross shape, and may include: a first channel which is disposed in a direction perpendicular to a direction in which the surface acoustic wave travels and connects a first inlet port into which the continuous phase is injected and the discharge port; and a second channel which is disposed upstream of the first channel near the first inlet port in a direction in which the surface acoustic wave travels and connects a second inlet port into which a first dispersed phase containing solid microparticles is injected and a third inlet port into which a second dispersed phase that does not contain solid microparticles is injected, wherein the first channel and the second channel are formed in communication with each other.

In addition, the microfluidic chip may be made of any one selected from silicon-based polymers, polymer compounds (plastics), glass, metal, and silicon (Si), or a combination of two or more thereof.

Further, the silicon-based polymer may be polydimethylsiloxane (PDMS).

Further, the polymer compound may include any one or more selected from polymethyl methacrylate (PMMA), polypropylene (PP), cyclic olefin copolymer (COC), and polyethylene terephthalate (PET).

Furthermore, the microfluidic chip may have a cavity formed therein from a surface adjacent to the SIDT electrode to the channel section so that the surface acoustic wave is applied into the microfluidic chip.

According to another aspect of the present invention, there is provided a method for washing and concentrating microparticles encapsulated in microscale droplets using an acoustic radiation force by using the apparatus according to the aspect of the present invention, wherein the washing method includes: 1) focusing surface acoustic waves in an acoustic wave focusing section of the channel section during an oscillation period of the AC signal and converting into longitudinal waves, thus to form an acoustic field inside the channel section; 2) when a first droplet composed of a continuous phase and a dispersed phase containing solid microparticles passes through the channel section and travels toward the discharge port, splitting the first droplet by the surface acoustic wave, such that a part thereof is captured in the acoustic field and the rest moves toward the discharge port, as well as the solid microparticles contained in the first droplet are focused inside the first droplet captured by the acoustic field on a side opposite to the discharge port, 3) merging a second droplet which is subsequently generated and enters the acoustic wave focusing section with the captured first droplet; 4) splitting the merged droplet again, wherein the droplet captured in the acoustic field is a part of the second droplet and the remaining droplet moves toward the discharge port; 5) then, washing an intermediate solution (dispersed phase), in which positions of the solid microparticles are fixed in the acoustic field by an acoustic radiation force and the solid microparticles are floating; and 6) discharging the second droplet captured in the acoustic field during the rest period of the AC signal from the discharge port, and applying an acoustic sound to a pair of the droplets by matching the oscillation period of the AC signal with a time required for the first droplet and the second droplet to pass through the acoustic wave focusing section, and the concentration method comprises: applying acoustic waves to a plurality of pairs of droplets by setting the oscillation period to be longer than the time required for the first droplet and the second droplet to pass through the acoustic wave focusing section, and by setting positions of the microparticles so that splitting and merging the droplets generated by intersection are repeatedly performed by acoustic radiation force while being fixed into the acoustic field in the same method as the above-described washing method, thereby increasing the population of solid microparticles in the acoustic field.

According to the means for solving the above-described problems, the present invention has the following effects.

The apparatus and method for washing and concentrating microparticles encapsulated in microscale droplets using an acoustic radiation force according to the present invention are performed in a non-contact and unlabelled manner, which was not possible in the conventional methods, thereby it is possible to selectively clean the microparticles encapsulated in the microscale droplets as desired, and concentrate the microparticles encapsulated in the microscale droplets, thus to increase the population thereof.

In addition, the present invention is provided with the microfluidic chip including the channel section formed in a cross shape so that the droplet composed of the continuous phase and the first dispersed phase and the droplet composed of the continuous phase and the second dispersed phase continuously flow in the same direction through the first channel of the channel section in an alternating manner, such that the intermediate solution of the sample can be freely replaced by the washing process for replacing the intermediate solution such as microparticles encapsulated in the droplets, cells, or biomolecules, and the microparticle populations can be increased to the desired level by concentrating the sample in the droplets to increase accuracy and efficiency of the droplet-based analysis.

Further, a conventional process which is performed by the skilled technician by hand using expensive equipment in a laboratory unit may be implemented as an automated process in a small microfluidic chip having a coin size.

Thereby, since the inventive apparatus and method are widely used in the fields such as new material synthesis, new drug development, biochemical analysis, and liquid biopsy that require liquid-based experiments and analysis, it is expected to greatly reduce costs and manpower required for the experiments.

Meanwhile, the apparatus and method for washing and concentrating microparticles encapsulated in microscale droplets using an acoustic radiation force according to the present invention may be applied as follows.

(1) When performing liquid biopsy, desired blood cells such as red blood cells or white blood cells in blood encapsulated in droplets may be cleaned with other intermediate solutions in plasma.

(2) When performing a fluorescent labeling process on a desired sample such as microparticles, cells, or biomolecules, excess fluorescent dye may be removed by washing the microparticles by replacing the intermediate solution of the target sample.

(3) When performing biochemical analysis on the basis of magnetized or polarized functional microparticles, an accuracy of the analysis may be improved by selectively washing only the target microparticles to which magnetic or polar bonds are fastened.

(4) By concentrating samples such as microparticles encapsulated in microscale droplets, cells, or biomolecules to increase the populations thereof, it is possible to increase the accuracy of the analysis by improving the signal-to-noise ratio of the sample.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferred embodiments of an apparatus and method for washing and concentrating microparticles encapsulated in microscale droplets using an acoustic radiation force according to the present invention will be described in detail with reference to the accompanying drawings. For reference, the terms and words used in the present disclosure and claims of the present invention should not be construed as limited to a lexical meaning, and should be understood as appropriate notions by the inventor based on that he/she is able to define terms to describe his/her invention in the best way to be seen by others. In addition, embodiments and drawings described in the present disclosure are simply the most preferred embodiment and do not represent all the technical sprites of the present invention, and it will be understood that various modifications and equivalents may be made to take the place of the embodiments at the time of filling the present application.

The apparatus and method for washing and concentrating microparticles encapsulated in microscale droplets using an acoustic radiation force according to the present invention use microscale droplet splitting technology using surface acoustic wave-based acoustic radiation force (Non-Patent Document 12) and microparticle position control technology using surface acoustic wave-based acoustic radiation force (Non-Patent Document 13), which are researched and executed by the inventor of the present application, and include a technology of generating two types of microscale droplets by intersection thereof at an intersecting point upstream of a microchannel section using a microfluidic chip having a cross-shaped microchannel section formed therein in addition to the above-described two technologies.

Further, by applying a periodic AC signal in which oscillation periods and rest periods are alternately repeated, the inventive apparatus and method allow processes of not only splitting the droplets, but also capturing, merging with other types of droplets, dividing, and discharging to be repeated.

At this time, the inventive apparatus and method use one type of continuous phase and two types of dispersed phases, as well as one type of droplet includes a sample such as microparticles, and the other type of droplet does not include a sample and use an intermediate solution to clean the sample as the dispersed phase.

Hereinafter, the present invention will be described in detail.

Figure 1:
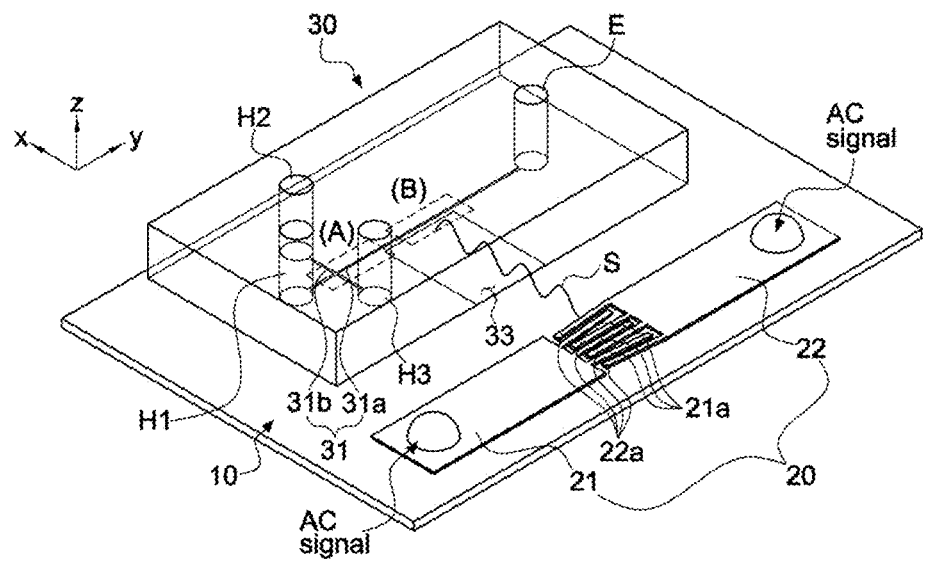
FIG. 1 is a perspective view illustrating an apparatus for washing and concentrating microparticles encapsulated in microscale droplets using an acoustic radiation force according to the present invention.
Figure 2:
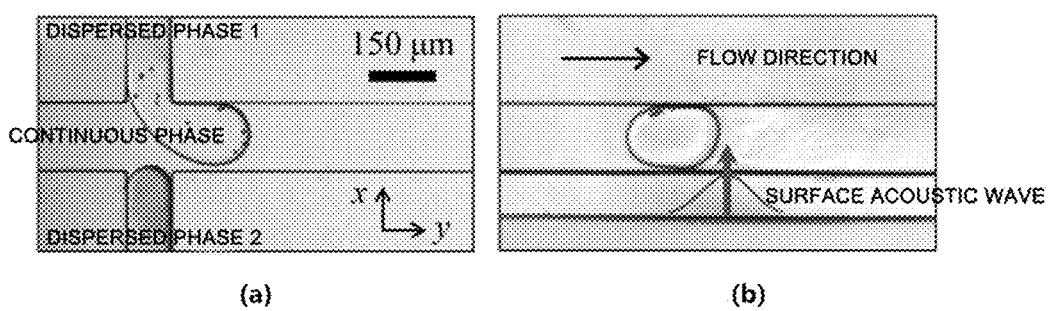
FIG. 2 is an enlarged view (a) of a portion A in FIG. 1, and an enlarged view (b) of a portion B (acoustic wave focusing section) in FIG. 1.

FIG. 1 is a perspective view illustrating the apparatus for washing and concentrating microparticles encapsulated in microscale droplets using an acoustic radiation force according to the present invention, and FIG. 2 is an enlarged view (a) of a portion A in FIG. 1, and an enlarged view (b) of a portion B (acoustic wave focusing section) in FIG. 1.

As illustrated in FIG. 1, the apparatus for washing and concentrating microparticles encapsulated in microscale droplets using an acoustic radiation force according to the present invention includes a piezoelectric substrate 10, a slanted finger interdigital transducer (SIDT) electrode 20, and a microfluidic chip 30.

The piezoelectric substrate 10 may be made of any one selected from lithium niobate ($LiNbO_3$), quartz, lithium tantalate ($LiTaO_3$), lithium tetraborate ($Li_2B_4O_7$), and langasite ($La_3Ga_5SiO_{14}$).

The slanted finger interdigital transducer (SIDT) electrode 20 is deposited on the piezoelectric substrate 10 to generate surface acoustic waves S under an AC signal applied thereto, and may be made of one or more selected from aluminum (Al), platinum (Pt), gold (Au), rhodium (Rh), iridium (Ir), copper (Cu), titanium (Ti), tungsten (W), chromium (Cr), nickel (Ni) or metallic compounds including these metals.

Herein, the AC signal is a periodic signal in which the oscillation periods and the rest periods are alternately repeated, and the surface acoustic wave S generated from the SIDT electrode 20 under the AC signal applied thereto is transmitted to a channel section 31 in a direction perpendicular to a direction in which droplets flow within the channel section 31 formed in a microfluidic chip 30 to be described below.

The microfluidic chip 30 is formed in a block form having a rectangular parallelepiped shape, and is adhered to the piezoelectric substrate 10 with being spaced apart from the SIDT electrode 20.

The above-described microfluidic chip 30 has the microscale channel section 31 formed therein, in which a single continuous phase and a plurality of dispersed phases are injected, respectively, so that a plurality of different droplets may be formed by intersection thereof and flow.

In addition, the microfluidic chip 30 has a cavity 33 formed therein from a surface adjacent to the SIDT electrode 20 to the channel section 31 so that the surface acoustic wave S is applied into the microfluidic chip 30.

Further, as illustrated in FIGS. 1 and 2, the microfluidic chip 30 includes a plurality of inlet ports H1, H2 and H3 for injecting the single continuous phase and the plurality of dispersed phases respectively, and a discharge port E for discharging a plurality of droplets composed of the continuous phase and the respective dispersed phases and generated by the intersection thereof.

Furthermore, the channel section 31 is formed in a cross shape, and includes: a first channel 31a which is disposed in a direction perpendicular to a direction in which the surface acoustic wave S travels and connects a first inlet port H1 into which the continuous phase is injected and the discharge port E; and a second channel 31b which is disposed upstream of the first channel 31a near the first inlet port H1 in a direction in which the surface acoustic wave S travels and connects a second inlet port H2 into which a first dispersed phase (dispersed phase 1 in the drawing) containing solid microparticles is injected and a third inlet port H3 into which a second dispersed phase (dispersed phase 2 in the drawing) that does not contain solid microparticles is injected.

At this time, the first channel 31a and the second channel 31b are formed in communication with each other.

As described above, the microfluidic chip is provided with the channel section formed in a cross shape so that the droplet composed of the continuous phase and the first dispersed phase and the droplet composed of the continuous phase and the second dispersed phase continuously flow in the same direction through the first channel of the channel section in an alternating manner, such that the intermediate solution of the sample can be freely replaced by the washing process for replacing the intermediate solution such as microparticles encapsulated in the droplets, cells, or biomolecules, and the microparticle populations can be increased to the desired level by concentrating the sample in the droplets to increase accuracy and efficiency of the droplet-based analysis.

Herein, an example, in which the channel section 31 is formed in the cross shape, has been described, but it is also possible to implement in other shapes depending on the number of the continuous and distributed phases.

Meanwhile, the continuous phase is a fluid which is not mixed with the plurality of dispersed phases, and the plurality of dispersed phases are fluids which are mixed with each other.

Further, the plurality of dispersed phases include a dispersed phase containing solid microparticles and a dispersed phase that does not contain solid microparticles.

The microfluidic chip 30 described as above may be made of any one selected from silicon-based polymers, polymer compounds (plastics), glass, metal, and silicon (Si), or a combination of two or more thereof.

In this case, the silicon-based polymer is preferably polydimethylsiloxane (PDMS).

In addition, the polymer compound may include any one or more selected from polymethyl methacrylate (PMMA), polypropylene (PP), cyclic olefin copolymer (COC), and polyethylene terephthalate (PET).

Figure 3:
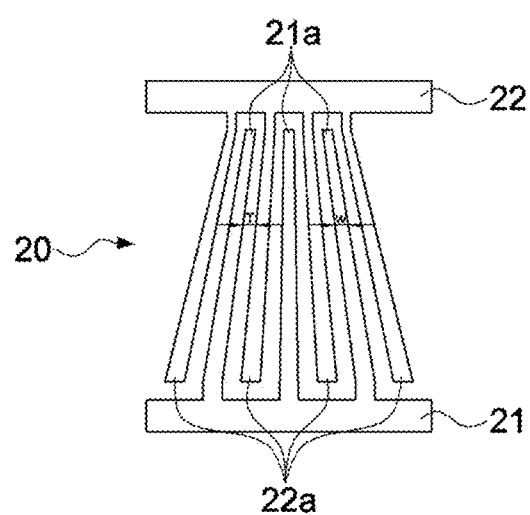
FIG. 3 is a view illustrating a structure of an arrangement structure of a slanted finger interdigital transducer (SIDT) electrode employed in the apparatus for washing and concentrating microparticles encapsulated in microscale droplets using an acoustic radiation force according to the present invention.

FIG. 3 is a view illustrating a structure of an arrangement structure of the slanted finger interdigital transducer (SIDT) electrode employed in the apparatus for washing and concentrating microparticles encapsulated in microscale droplets using an acoustic radiation force according to the present invention The SIDT electrode 20 includes: a first electrode terminal 21 and a second electrode terminal 22 formed at both end portions of the piezoelectric substrate 10; and a plurality of first finger electrodes 21a and a plurality of second finger electrodes 22a, which protrude from the first and second electrode terminals 21 and 22, respectively, toward each other in a longitudinal direction of the SIDT electrode 20 with being alternately formed in a width direction thereof, and are deposited in a pattern shape in which the first and second finger electrodes 21a and 22a are interposed therebetween like two forks whose plurality of ends are overlapped to face each other with being alternately disposed so as not to contact with each other.

In this case, metal electrodes forming the plurality of first finger electrodes 21a and the plurality of second finger electrodes 22a have a width W (a width of each finger electrode) of λ/4, respectively, and the respective metal electrodes have a gap T of λ/4 formed therebetween (a gap between the respective finger electrodes), wherein λ is a wavelength of the surface acoustic wave S.

In addition, the metal electrodes forming the first finger electrode 21a and the second finger electrode 22a of the SIDT electrode 20 may be configured to have a Cr/Au lamination structure in which chromium (Cr) forming a bottom layer and gold (Au) forming an upper layer are laminated on each other.

Further, the respective widths W of the plurality of first finger electrodes 21a and the plurality of second finger electrodes 22a and the gaps T between each of the first finger electrodes 21a and the second finger electrodes 22a are formed so as to be linearly varied along the longitudinal direction of the SIDT electrode 20 so that the first and second finger electrodes 21a and 22a form a trapezoidal slanted comb shape as a whole.

Due to the linearly varying respective widths of the plurality of first finger electrodes 21a and the plurality of second finger electrodes 22a and the gaps between each of the first finger electrodes 21a and second finger electrodes 22a, the slanted comb-shaped SIDT electrode have resonant frequencies different from each other depending on positions thereof, which are determined by Equation (1) below:

$$f = \frac{c}{\lambda} \quad (1)$$

(wherein, f is a frequency of the AC signal applied to the electrode, c is a traveling speed of acoustic wave on the piezoelectric substrate 10, and λ is a wavelength of the surface acoustic wave S, which is four times the gap between the electrodes and the width (λ/4) of each electrode.

Thus, the slanted comb-shaped SIDT electrode may selectively generate the surface acoustic wave at a desired position depending on the frequency of the AC applied to the electrode.

At this time, the surface acoustic wave S refers to a wave propagating along the surface of the piezoelectric substrate 10.

In general, a rectangular interdigital transducer (IDT) electrode has a single resonant frequency, whereas the slanted comb-shaped SIDT electrode employed in the present invention has an advantage of having a resonant frequency band, that is, a plurality of resonant frequencies.

Figure 4:
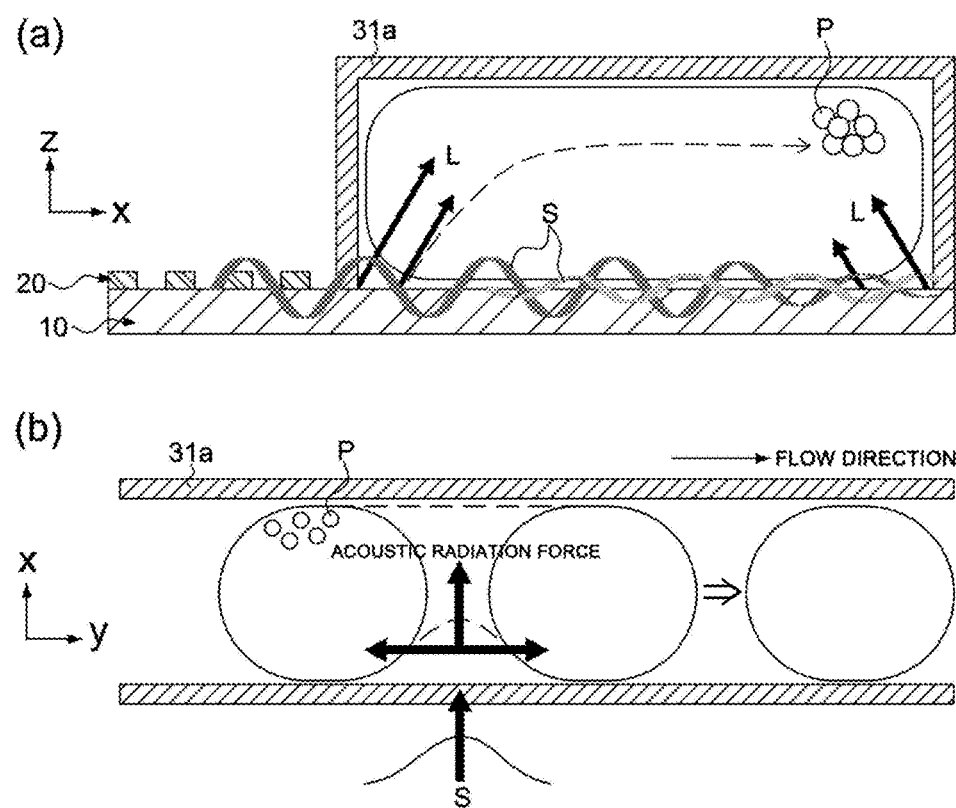
FIG. 4 is a cross-sectional view (a) illustrating a state in which surface acoustic waves are transmitted from the SIDT electrode in FIG. 1 to a micro channel section pattern formed in a microfluidic chip, and is a cross-sectional view (b) illustrating droplets in the micro channel section.

FIG. 4 is a cross-sectional view (a) illustrating a state in which surface acoustic waves are transmitted from the SIDT electrode in FIG. 1 to a micro channel section pattern formed in a microfluidic chip, and is a cross-sectional view (b) illustrating droplets in the micro channel section.

When applying an AC signal to the slanted comb-shaped SIDT electrode 20, a surface acoustic wave S is generated.

The surface acoustic wave S generated as described above is focused on a fluid region in the channel section 31, and is converted into a longitudinal wave (compressional wave) L to form an acoustic field.

Solid microparticles P exposed to the acoustic field are pushed in a propagation direction of the acoustic wave under an acoustic radiation force.

As illustrated in FIG. 4 (b), the droplet exposed to the acoustic wave is split into two or more droplets by the acoustic radiation force.

At this time, a part of droplets (on a left side based on the acoustic field) is captured in the acoustic field to be fixed thereto and do not move to the discharge port, and the remaining droplets (on a right side based on the acoustic field) move out of the acoustic field to the discharge port.

Figure 5:
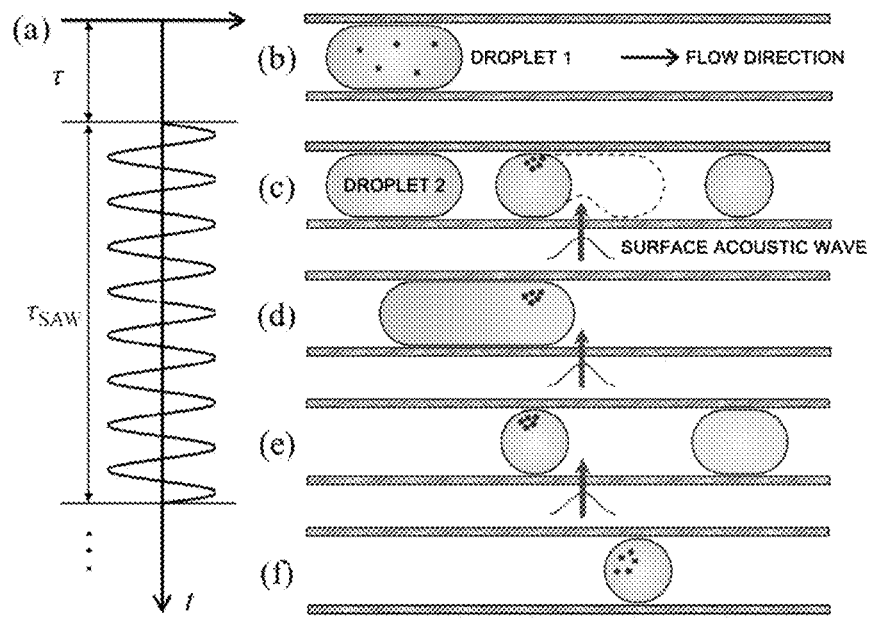
FIG. 5 is a view (a) illustrating a periodic AC signal applied to the SIDT electrode for washing and concentrating solid microparticles encapsulated in droplets, and views (b) to (f) illustrating moving processes of the droplets in the microchannel section.

FIG. 5 is a view (a) illustrating a periodic AC signal applied to the SIDT electrode for washing and concentrating solid microparticles encapsulated in droplets, and views (b) to (f) illustrating moving processes of the droplets in the microchannel section.

In (a) of FIG. 5, τ is the rest period in which no AC signal is applied, and τSAW is the oscillation period in which the AC signal is applied. Herein, a periodic AC signal in which the rest periods τ and the oscillation periods τSAW are alternately repeated is applied to the SIDT electrode.

At this time, the acoustic field is generated during the oscillation period τSAW in which the AC signal exists, and the acoustic field is not formed during the rest period τ.

Accordingly, the periodic AC signal in which the rest periods τ and the oscillation periods τSAW are alternately repeated is applied to the SIDT electrode in accordance with a generation cycle of two types of droplets generated by intersection thereof.

As illustrated in (b) of FIG. 5, a droplet 1 containing solid microparticles is generated upstream and enters an acoustic wave focusing section.

As illustrated in (c) of FIG. 5, the droplet 1 is split by the acoustic wave, then a part thereof is captured in the acoustic field, and the rest moves toward the discharge port.

At this time, the solid microparticles in the droplet 1 are focused on a wall surface of the droplet 1 captured by the acoustic radiation force on a side opposite to the discharge port in the micro channel section.

As illustrated in (d) of FIG. 5, a droplet 2 which is subsequently generated and enters the acoustic wave focusing section is merged with the captured droplet 1.

As illustrated in (e) of FIG. 5, the merged droplet is split again, wherein the droplet captured in the acoustic field is a part of the droplet 2 including only the dispersed phase containing solid microparticles and the remaining droplet moves toward the discharge port.

At this time, the solid microparticles are fixed in the acoustic field by the acoustic radiation force, such that the intermediate solution is replaced from the dispersed phase containing the solid microparticles to the dispersed phase that does not contain solid microparticles.

As illustrated in (f) of FIG. 5, the droplet 2 captured in the acoustic field and the microparticles in the droplet 2 are released and move toward the discharge port during the rest period τ of the next cycle.

Figure 6:
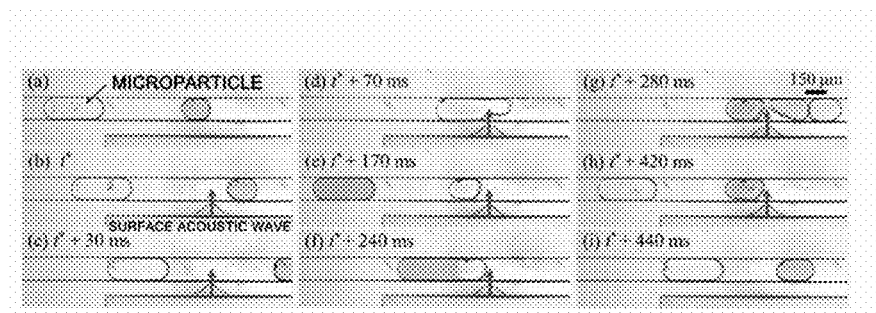
FIG. 6 is experimental images (a) to (i) illustrating a process of washing the microparticles encapsulated in the droplets.

FIG. 6 is experimental images (a) to (i) illustrating a process of washing the microparticles encapsulated in the droplets.

In the experiment, polystyrene solid microparticles were used as solid microparticles, water and a solution mixed with water were used as the first and second dispersed phase for classification, and a fluorocarbon oil was used as the continuous phase.

In this regard, the washing method of the present invention is characterized in that: 1) the surface acoustic waves are focused in the acoustic wave focusing section (B in FIG. 1) of the channel section during the oscillation period of the AC signal, and converted into the longitudinal waves, thus to form an acoustic field inside the channel section; 2) when a droplet 1 (a droplet on the left in the drawings, which corresponds to a first droplet in the claims) composed of a continuous phase and a dispersed phase containing solid microparticles passes through the channel section and travels toward the discharge port, the droplet 1 is split by the surface acoustic wave, such that a part thereof is captured in the acoustic field and the rest moves toward the discharge port, as well as the solid microparticles contained in the droplet 1 are focused inside the droplet 1 captured by the acoustic field on a side opposite to the discharge port; 3) a droplet 2 (a droplet on the right in the drawings) which is subsequently generated and enters the acoustic wave focusing section is merged with the captured droplet 1; 4) the merged droplet is split again, wherein the droplet captured in the acoustic field is a part of the droplet 2 and the remaining droplet moves toward the discharge port; 5) then, the intermediate solution (dispersed phase), in which positions of the solid microparticles are fixed in the acoustic field by the acoustic radiation force and the solid microparticles are floating, is cleaned; and 6) the droplet 2 captured in the acoustic field during the rest period of the AC signal is discharged from the discharge port, and an acoustic wave is applied to a pair of the droplets by matching the oscillation period of the AC signal with a time required for the droplet 1 and the droplet 2 to pass through the acoustic wave focusing section (B in FIG. 1).

Figure 7:
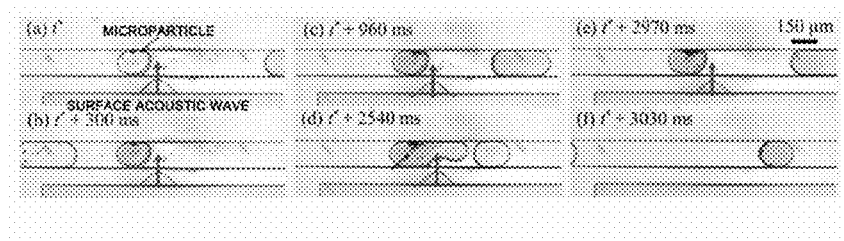
FIG. 7 is experimental images (a) to (f) illustrating a process of concentrating the microparticles encapsulated in the droplets.

FIG. 7 is experimental images (a) to (f) illustrating a process of concentrating the microparticles encapsulated in the droplets.

A difference between the washing process and the concentration process is in the oscillation period $\tau_{SAW}$ of the AC signal applied to the slanted comb-shaped SIDT electrode.

In the case of the washing process, the acoustic wave is applied to the pair of the droplets by matching the oscillation period of the AC signal with the time required for the droplet 1 and the droplet 2 to pass through the acoustic wave focusing section (B in FIG. 1).

In contrast, in the case of the concentration process, the oscillation period $\tau_{SAW}$ is set to be longer than the time required for the droplet 1 and the droplet 2 to pass through the acoustic wave focusing section, thereby applying acoustic waves to a plurality of pairs of droplets.

Thus, the solid microparticles contained in the plurality of droplets 1 are captured and focused in the acoustic field.

As a result, as illustrated in (a) of FIG. 7, the number of solid microparticles in a droplet 1 (a droplet on the left in the drawings) is continuously increased, and the droplet 1 is released from the acoustic field as the intermediate solution is replaced, thus to move to the discharge port as illustrated in (f) of FIG. 7.

In other words, the concentration method is characterized by applying acoustic waves to a plurality of pairs of droplets by setting the oscillation period $\tau_{SAW}$ to be longer than the time required for the droplet 1 and a droplet 2 (a droplet on the right in the drawings) to pass through the acoustic wave focusing section, and by setting positions of the microparticles so that splitting and merging the droplets generated by intersection are repeatedly performed by acoustic radiation force while being fixed in the acoustic field in the same method as the above-described washing method, thereby increasing the population of solid microparticles in the acoustic field.

While the present invention has been described with reference to the preferred embodiments, the present invention is not limited to the above-described embodiments and the accompanying drawings, and it will be understood by those skilled in the art that various substitutions, modifications, and alternations may be made therein without departing from the technical spirit of the present invention.

DESCRIPTION OF REFERENCE NUMERALS

10: Piezoelectric substrate
20: SIDT electrode
21: First electrode terminal
21a: First finger electrode
22: Second electrode terminal
22a: Second finger electrode
30: Microfluidic chip
31: Channel section
31a: First channel
31b: Second channel
33: Cavity
S: Surface acoustic wave
L: Longitudinal wave
P: Solid microparticle
W: Metal wire width of electrode
T: Gap between metal electrodes
H1: First inlet port
H2: Second inlet port
H3: Third inlet port
E: Discharge port

What is claimed is:

1. An apparatus for washing and concentrating microparticles encapsulated in microscale droplets using an acoustic radiation force, the apparatus comprising:

a piezoelectric substrate;
a slanted finger interdigital transducer (SIDT) electrode deposited on the piezoelectric substrate and configured to generate surface acoustic waves under an AC signal applied thereto; and
a microfluidic chip which is formed in a block form and is adhered to the piezoelectric substrate with being spaced apart from the SIDT electrode, has a microscale channel section formed therein, in which a single continuous phase and a plurality of dispersed phases are injected, respectively, so that a plurality of different droplets are formed by intersection thereof, and includes a plurality of inlet ports into which the single continuous phase and the plurality of dispersed phases are injected, respectively, and a discharge port from which a plurality of droplets composed of the continuous phase and the respective dispersed phases and generated by the intersection thereof are discharged,
wherein the continuous phase is a fluid which is not mixed with the plurality of dispersed phases, the plurality of dispersed phases are fluids which are mixed with each other, and the plurality of dispersed phases include a dispersed phase containing solid microparticles and a dispersed phase that does not contain solid microparticles, and
the AC signal is a periodic signal in which oscillation periods and rest periods are alternately repeated, and the surface acoustic wave generated from the SIDT electrode under the AC signal applied thereto is transmitted to the channel section in a direction perpendicular to a direction in which the droplets flow in the channel section.

2. The apparatus according to claim 1, wherein the SIDT electrode includes: a first electrode terminal and a second electrode terminal formed at both end portions of the piezoelectric substrate; and a plurality of first finger electrodes and a plurality of second finger electrodes, which protrude from the first and second electrode terminals, respectively, toward each other in a longitudinal direction of the SIDT electrode with being alternately formed in a width direction thereof, and are deposited in a pattern shape in which the first and second finger electrodes are interposed therebetween like two forks whose ends are overlapped to face each other with being alternately disposed so as not to contact with each other.

3. The apparatus according to claim 2, wherein metal electrodes forming the plurality of first finger electrodes and the plurality of second finger electrodes have a width of $\lambda/4$, respectively, and the respective metal electrodes have a gap of $\lambda/4$ formed between, wherein $\lambda$ is a wavelength of the surface acoustic wave.

4. The apparatus according to claim 3, wherein the respective widths of the plurality of first finger electrodes and the plurality of second finger electrodes and the gaps between each of the first finger electrodes and the second finger electrodes are formed so as to be linearly varied along the longitudinal direction of the SIDT electrode so that the first and second finger electrodes form a trapezoidal slanted comb shape as a whole.

5. The apparatus according to claim 1, wherein the channel section is formed in a cross shape, and includes:
a first channel which is disposed in a direction perpendicular to a direction in which the surface acoustic wave travels and connects a first inlet port into which the continuous phase is injected and the discharge port; and
a second channel which is disposed upstream of the first channel near the first inlet port in a direction in which the surface acoustic wave travels and connects a second inlet port into which a first dispersed phase containing solid microparticles is injected and a third inlet port into which a second dispersed phase that does not contain solid microparticles is injected,
wherein the first channel and the second channel are formed in communication with each other.

6. The apparatus according to claim 1, wherein the microfluidic chip is made of any one selected from silicon-based polymers, polymer compounds (plastics), glass, metal, and silicon (Si), or a combination of two or more thereof.

7. The apparatus according to claim 6, wherein the silicon-based polymer is polydimethylsiloxane (PDMS).

8. The apparatus according to claim 6, wherein the polymer compound includes any one or more selected from polymethyl methacrylate (PMMA), polypropylene (PP), cyclic olefin copolymer (COC), and polyethylene terephthalate (PET).

9. The apparatus according to claim 6, wherein the microfluidic chip has a cavity formed therein from a surface adjacent to the SIDT electrode to the channel section so that the surface acoustic wave is applied into the microfluidic chip.

10. A method for washing and concentrating microparticles encapsulated in microscale droplets using an acoustic radiation force by using the apparatus according to claim 1,
wherein the washing method comprises:
1) focusing surface acoustic waves in an acoustic wave focusing section of the channel section during an oscillation period of the AC signal and converting into longitudinal waves, thus to form an acoustic field inside the channel section;
2) when a first droplet composed of a continuous phase and a dispersed phase containing solid microparticles passes through the channel section and travels toward the discharge port, splitting the first droplet by the surface acoustic wave, such that a part thereof is captured in the acoustic field and the rest moves toward the discharge port, as well as the solid microparticles contained in the first droplet are focused inside the first droplet captured by the acoustic field on a side opposite to the discharge port,
3) merging a second droplet which is subsequently generated and enters the acoustic wave focusing section with the captured first droplet;
4) splitting the merged droplet again, wherein the droplet captured in the acoustic field is a part of the second droplet and the remaining droplet moves toward the discharge port;
5) then, washing an intermediate solution (dispersed phase), in which positions of the solid microparticles are fixed in the acoustic field by an acoustic radiation force and the solid microparticles are floating; and
6) discharging the second droplet captured in the acoustic field during the rest period of the AC signal from the discharge port, and applying an acoustic sound to a pair of the droplets by matching the oscillation period of the AC signal with a time required for the first droplet and the second droplet to pass through the acoustic wave focusing section, and
the concentration method comprises:
applying acoustic waves to a plurality of pairs of droplets by setting the oscillation period to be longer than the time required for the first droplet and the second droplet to pass through the acoustic wave focusing section, and by setting positions of the microparticles so that splitting and merging the droplets generated by intersection are repeatedly performed by acoustic radiation force while being fixed into the acoustic field in the same method as the above-described washing method, thereby increasing the population of solid microparticles in the acoustic field.

11. A method for washing and concentrating microparticles encapsulated in microscale droplets using an acoustic radiation force by using the apparatus according to claim 2, wherein the washing method comprises:
1) focusing surface acoustic waves in an acoustic wave focusing section of the channel section during an oscillation period of the AC signal and converting into longitudinal waves, thus to form an acoustic field inside the channel section;
2) when a first droplet composed of a continuous phase and a dispersed phase containing solid microparticles passes through the channel section and travels toward the discharge port, splitting the first droplet by the surface acoustic wave, such that a part thereof is captured in the acoustic field and the rest moves toward the discharge port, as well as the solid microparticles contained in the first droplet are focused inside the first droplet captured by the acoustic field on a side opposite to the discharge port,
3) merging a second droplet which is subsequently generated and enters the acoustic wave focusing section with the captured first droplet;
4) splitting the merged droplet again, wherein the droplet captured in the acoustic field is a part of the second droplet and the remaining droplet moves toward the discharge port;
5) then, washing an intermediate solution (dispersed phase), in which positions of the solid microparticles are fixed in the acoustic field by an acoustic radiation force and the solid microparticles are floating; and
6) discharging the second droplet captured in the acoustic field during the rest period of the AC signal from the discharge port, and applying an acoustic sound to a pair of the droplets by matching the oscillation period of the AC signal with a time required for the first droplet and the second droplet to pass through the acoustic wave focusing section, and the concentration method comprises:
applying acoustic waves to a plurality of pairs of droplets by setting the oscillation period to be longer than the time required for the first droplet and the second droplet to pass through the acoustic wave focusing section, and by setting positions of the microparticles so that splitting and merging the droplets generated by intersection are repeatedly performed by acoustic radiation force while being fixed into the acoustic field in the same method as the above-described washing method, thereby increasing the population of solid microparticles in the acoustic field.

12. A method for washing and concentrating microparticles encapsulated in microscale droplets using an acoustic radiation force by using the apparatus according to claim 3, wherein the washing method comprises:
1) focusing surface acoustic waves in an acoustic wave focusing section of the channel section during an oscillation period of the AC signal and converting into longitudinal waves, thus to form an acoustic field inside the channel section;
2) when a first droplet composed of a continuous phase and a dispersed phase containing solid microparticles passes through the channel section and travels toward the discharge port, splitting the first droplet by the surface acoustic wave, such that a part thereof is captured in the acoustic field and the rest moves toward the discharge port, as well as the solid microparticles contained in the first droplet are focused inside the first droplet captured by the acoustic field on a side opposite to the discharge port,
3) merging a second droplet which is subsequently generated and enters the acoustic wave focusing section with the captured first droplet;
4) splitting the merged droplet again, wherein the droplet captured in the acoustic field is a part of the second droplet and the remaining droplet moves toward the discharge port;
5) then, washing an intermediate solution (dispersed phase), in which positions of the solid microparticles are fixed in the acoustic field by an acoustic radiation force and the solid microparticles are floating; and
6) discharging the second droplet captured in the acoustic field during the rest period of the AC signal from the discharge port, and applying an acoustic sound to a pair of the droplets by matching the oscillation period of the AC signal with a time required for the first droplet and the second droplet to pass through the acoustic wave focusing section, and the concentration method comprises:
applying acoustic waves to a plurality of pairs of droplets by setting the oscillation period to be longer than the time required for the first droplet and the second droplet to pass through the acoustic wave focusing section, and by setting positions of the microparticles so that splitting and merging the droplets generated by intersection are repeatedly performed by acoustic radiation force while being fixed into the acoustic field in the same method as the above-described washing method, thereby increasing the population of solid microparticles in the acoustic field.

13. A method for washing and concentrating microparticles encapsulated in microscale droplets using an acoustic radiation force by using the apparatus according to claim 4, wherein the washing method comprises:
1) focusing surface acoustic waves in an acoustic wave focusing section of the channel section during an oscillation period of the AC signal and converting into longitudinal waves, thus to form an acoustic field inside the channel section;
2) when a first droplet composed of a continuous phase and a dispersed phase containing solid microparticles passes through the channel section and travels toward the discharge port, splitting the first droplet by the surface acoustic wave, such that a part thereof is captured in the acoustic field and the rest moves toward the discharge port, as well as the solid microparticles contained in the first droplet are focused inside the first droplet captured by the acoustic field on a side opposite to the discharge port,
3) merging a second droplet which is subsequently generated and enters the acoustic wave focusing section with the captured first droplet;
4) splitting the merged droplet again, wherein the droplet captured in the acoustic field is a part of the second droplet and the remaining droplet moves toward the discharge port;

5) then, washing an intermediate solution (dispersed phase), in which positions of the solid microparticles are fixed in the acoustic field by an acoustic radiation force and the solid microparticles are floating; and 6) discharging the second droplet captured in the acoustic field during the rest period of the AC signal from the discharge port, and applying an acoustic sound to a pair of the droplets by matching the oscillation period of the AC signal with a time required for the first droplet and the second droplet to pass through the acoustic wave focusing section, and the concentration method comprises:

applying acoustic waves to a plurality of pairs of droplets by setting the oscillation period to be longer than the time required for the first droplet and the second droplet to pass through the acoustic wave focusing section, and by setting positions of the microparticles so that splitting and merging the droplets generated by intersection are repeatedly performed by acoustic radiation force while being fixed into the acoustic field in the same method as the above-described washing method, thereby increasing the population of solid microparticles in the acoustic field.

14. A method for washing and concentrating microparticles encapsulated in microscale droplets using an acoustic radiation force by using the apparatus according to claim 5, wherein the washing method comprises:

1) focusing surface acoustic waves in an acoustic wave focusing section of the channel section during an oscillation period of the AC signal and converting into longitudinal waves, thus to form an acoustic field inside the channel section;

2) when a first droplet composed of a continuous phase and a dispersed phase containing solid microparticles passes through the channel section and travels toward the discharge port, splitting the first droplet by the surface acoustic wave, such that a part thereof is captured in the acoustic field and the rest moves toward the discharge port, as well as the solid microparticles contained in the first droplet are focused inside the first droplet captured by the acoustic field on a side opposite to the discharge port, 3) merging a second droplet which is subsequently generated and enters the acoustic wave focusing section with the captured first droplet;

4) splitting the merged droplet again, wherein the droplet captured in the acoustic field is a part of the second droplet and the remaining droplet moves toward the discharge port;

5) then, washing an intermediate solution (dispersed phase), in which positions of the solid microparticles are fixed in the acoustic field by an acoustic radiation force and the solid microparticles are floating; and 6) discharging the second droplet captured in the acoustic field during the rest period of the AC signal from the discharge port, and applying an acoustic sound to a pair of the droplets by matching the oscillation period of the AC signal with a time required for the first droplet and the second droplet to pass through the acoustic wave focusing section, and the concentration method comprises:

applying acoustic waves to a plurality of pairs of droplets by setting the oscillation period to be longer than the time required for the first droplet and the second droplet to pass through the acoustic wave focusing section, and by setting positions of the microparticles so that splitting and merging the droplets generated by intersection are repeatedly performed by acoustic radiation force while being fixed into the acoustic field in the same method as the above-described washing method, thereby increasing the population of solid microparticles in the acoustic field.

15. A method for washing and concentrating microparticles encapsulated in microscale droplets using an acoustic radiation force by using the apparatus according to claim 6, wherein the washing method comprises:

1) focusing surface acoustic waves in an acoustic wave focusing section of the channel section during an oscillation period of the AC signal and converting into longitudinal waves, thus to form an acoustic field inside the channel section;

2) when a first droplet composed of a continuous phase and a dispersed phase containing solid microparticles passes through the channel section and travels toward the discharge port, splitting the first droplet by the surface acoustic wave, such that a part thereof is captured in the acoustic field and the rest moves toward the discharge port, as well as the solid microparticles contained in the first droplet are focused inside the first droplet captured by the acoustic field on a side opposite to the discharge port, 3) merging a second droplet which is subsequently generated and enters the acoustic wave focusing section with the captured first droplet;

4) splitting the merged droplet again, wherein the droplet captured in the acoustic field is a part of the second droplet and the remaining droplet moves toward the discharge port;

5) then, washing an intermediate solution (dispersed phase), in which positions of the solid microparticles are fixed in the acoustic field by an acoustic radiation force and the solid microparticles are floating; and 6) discharging the second droplet captured in the acoustic field during the rest period of the AC signal from the discharge port, and applying an acoustic sound to a pair of the droplets by matching the oscillation period of the AC signal with a time required for the first droplet and the second droplet to pass through the acoustic wave focusing section, and the concentration method comprises:

applying acoustic waves to a plurality of pairs of droplets by setting the oscillation period to be longer than the time required for the first droplet and the second droplet to pass through the acoustic wave focusing section, and by setting positions of the microparticles so that splitting and merging the droplets generated by intersection are repeatedly performed by acoustic radiation force while being fixed into the acoustic field in the same method as the above-described washing method, thereby increasing the population of solid microparticles in the acoustic field.

16. A method for washing and concentrating microparticles encapsulated in microscale droplets using an acoustic radiation force by using the apparatus according to claim 7, wherein the washing method comprises:

1) focusing surface acoustic waves in an acoustic wave focusing section of the channel section during an oscillation period of the AC signal and converting into longitudinal waves, thus to form an acoustic field inside the channel section;
2) when a first droplet composed of a continuous phase and a dispersed phase containing solid microparticles passes through the channel section and travels toward the discharge port, splitting the first droplet by the surface acoustic wave, such that a part thereof is captured in the acoustic field and the rest moves toward the discharge port, as well as the solid microparticles contained in the first droplet are focused inside the first droplet captured by the acoustic field on a side opposite to the discharge port,
3) merging a second droplet which is subsequently generated and enters the acoustic wave focusing section with the captured first droplet;
4) splitting the merged droplet again, wherein the droplet captured in the acoustic field is a part of the second droplet and the remaining droplet moves toward the discharge port;
5) then, washing an intermediate solution (dispersed phase), in which positions of the solid microparticles are fixed in the acoustic field by an acoustic radiation force and the solid microparticles are floating; and
6) discharging the second droplet captured in the acoustic field during the rest period of the AC signal from the discharge port, and applying an acoustic sound to a pair of the droplets by matching the oscillation period of the AC signal with a time required for the first droplet and the second droplet to pass through the acoustic wave focusing section, and the concentration method comprises:
applying acoustic waves to a plurality of pairs of droplets by setting the oscillation period to be longer than the time required for the first droplet and the second droplet to pass through the acoustic wave focusing section, and by setting positions of the microparticles so that splitting and merging the droplets generated by intersection are repeatedly performed by acoustic radiation force while being fixed into the acoustic field in the same method as the above-described washing method, thereby increasing the population of solid microparticles in the acoustic field.

17. A method for washing and concentrating microparticles encapsulated in microscale droplets using an acoustic radiation force by using the apparatus according to claim 8, wherein the washing method comprises:
1) focusing surface acoustic waves in an acoustic wave focusing section of the channel section during an oscillation period of the AC signal and converting into longitudinal waves, thus to form an acoustic field inside the channel section;
2) when a first droplet composed of a continuous phase and a dispersed phase containing solid microparticles passes through the channel section and travels toward the discharge port, splitting the first droplet by the surface acoustic wave, such that a part thereof is captured in the acoustic field and the rest moves toward the discharge port, as well as the solid microparticles contained in the first droplet are focused inside the first droplet captured by the acoustic field on a side opposite to the discharge port,
3) merging a second droplet which is subsequently generated and enters the acoustic wave focusing section with the captured first droplet;
4) splitting the merged droplet again, wherein the droplet captured in the acoustic field is a part of the second droplet and the remaining droplet moves toward the discharge port;
5) then, washing an intermediate solution (dispersed phase), in which positions of the solid microparticles are fixed in the acoustic field by an acoustic radiation force and the solid microparticles are floating; and
6) discharging the second droplet captured in the acoustic field during the rest period of the AC signal from the discharge port, and applying an acoustic sound to a pair of the droplets by matching the oscillation period of the AC signal with a time required for the first droplet and the second droplet to pass through the acoustic wave focusing section, and the concentration method comprises:
applying acoustic waves to a plurality of pairs of droplets by setting the oscillation period to be longer than the time required for the first droplet and the second droplet to pass through the acoustic wave focusing section, and by setting positions of the microparticles so that splitting and merging the droplets generated by intersection are repeatedly performed by acoustic radiation force while being fixed into the acoustic field in the same method as the above-described washing method, thereby increasing the population of solid microparticles in the acoustic field.

18. A method for washing and concentrating microparticles encapsulated in microscale droplets using an acoustic radiation force by using the apparatus according to claim 9, wherein the washing method comprises:
1) focusing surface acoustic waves in an acoustic wave focusing section of the channel section during an oscillation period of the AC signal and converting into longitudinal waves, thus to form an acoustic field inside the channel section;
2) when a first droplet composed of a continuous phase and a dispersed phase containing solid microparticles passes through the channel section and travels toward the discharge port, splitting the first droplet by the surface acoustic wave, such that a part thereof is captured in the acoustic field and the rest moves toward the discharge port, as well as the solid microparticles contained in the first droplet are focused inside the first droplet captured by the acoustic field on a side opposite to the discharge port,
3) merging a second droplet which is subsequently generated and enters the acoustic wave focusing section with the captured first droplet;
4) splitting the merged droplet again, wherein the droplet captured in the acoustic field is a part of the second droplet and the remaining droplet moves toward the discharge port;
5) then, washing an intermediate solution (dispersed phase), in which positions of the solid microparticles are fixed in the acoustic field by an acoustic radiation force and the solid microparticles are floating; and
6) discharging the second droplet captured in the acoustic field during the rest period of the AC signal from the discharge port, and applying an acoustic sound to a pair of the droplets by matching the oscillation period of the AC signal with a time required for the first droplet and the second droplet to pass through the acoustic wave focusing section, and the concentration method comprises:
applying acoustic waves to a plurality of pairs of droplets by setting the oscillation period to be longer than the time required for the first droplet and the second droplet to pass through the acoustic wave focusing section, and by setting positions of the microparticles so that splitting and merging the droplets generated by intersection are repeatedly performed by acoustic radiation force while being fixed into the acoustic field in the same method as the above-described washing method, thereby increasing the population of solid microparticles in the acoustic field.

* * * * *